W. A. MORKERT.
STEERING GEAR.
APPLICATION FILED SEPT. 19, 1916.
1,226,568.
Patented May 15, 1917.
2 SHEETS—SHEET 1.
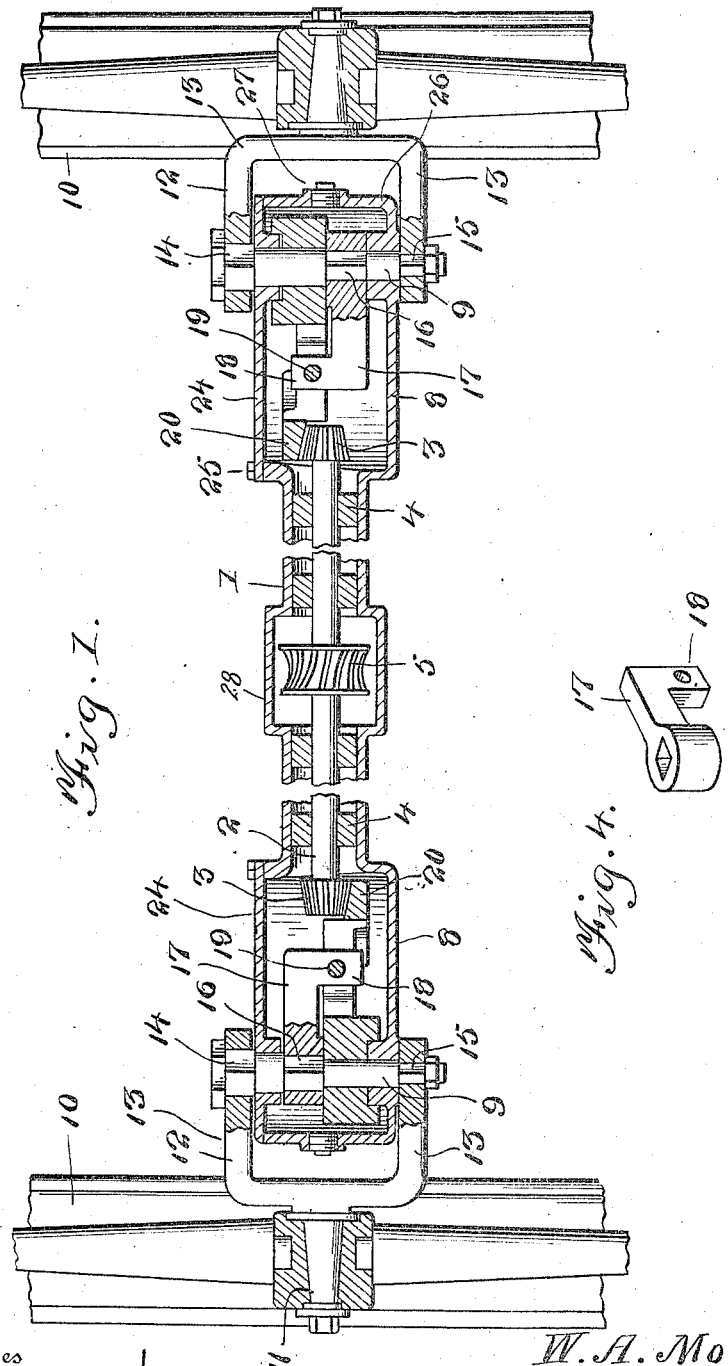
Inventor
W. A. Morkert
By Victor J. Evans
Attorney
Witnesses

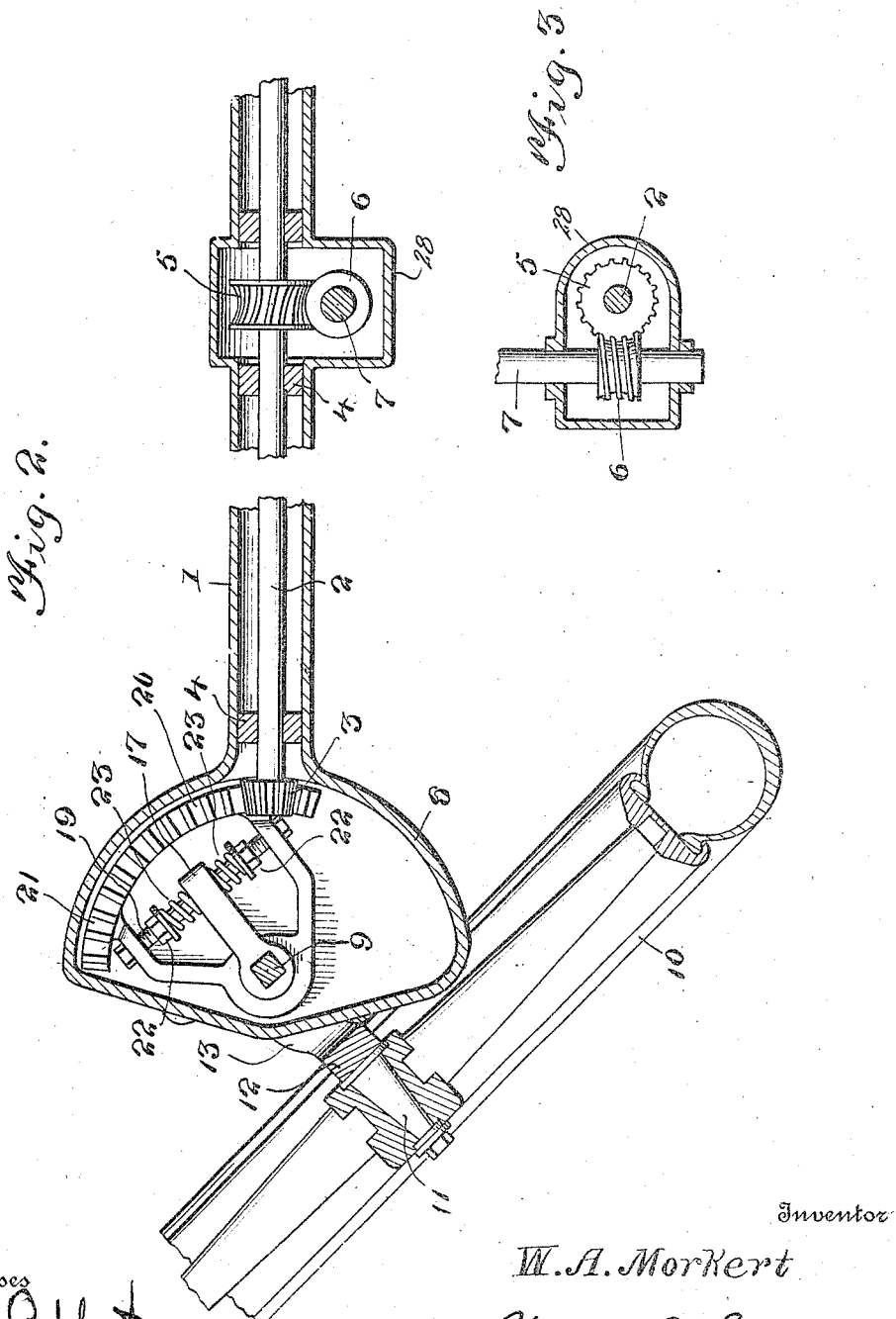

UNITED STATES PATENT OFFICE.

WALTER A. MORKERT, OF THOMPSON FALLS, MONTANA.

STEERING-GEAR.

1,226,568.

Specification of Letters Patent.

Patented May 15, 1917.

Application filed September 19, 1916. Serial No. 120,999.

*To all whom it may concern:*

Be it known that I, WALTER A. MORKERT, a citizen of the United States, residing at Thompson Falls, in the county of Sanders and State of Montana, have invented new and useful Improvements in Steering-Gears, of which the following is a specification.

This invention relates to steering gear especially designed for motor vehicles such as automobiles, motor trucks, traction engines and the like, the broad object of the invention being to provide steering gear in which practically all of the working parts are inclosed so that they are protected from dust, dirt and other foreign matter and capable of being run in oil, grease or other lubricating material. The construction also guards against the breakage of the ordinary steering connections which are now necessarily located exteriorly of the front axle of the machine or that axle which is carried by the steering wheels.

A further object in view is to provide novel means whereby a yielding or compensating connection is provided between the steering shaft and the steering wheels for the purpose of taking up sudden jars and unexpected movements of the steering wheels, thereby preventing the hand controlling wheel from being snatched out of the hands of the operator of the vehicle.

With the above and other objects in view, the invention consists in the novel construction, combination and arrangement, herein fully described, illustrated and claimed.

In the accompanying drawings:

Figure 1 is a vertical longitudinal section taken lengthwise of the axle of the machine having the steering gear associated therewith.

Fig. 2 is a fragmentary plan view of the same taken in line with the pinion shaft.

Fig. 3 is a fragmentary section taken adjacent to the steering shaft.

Fig. 4 is a detail perspective view of the buffer arm.

In carrying out the present invention, the steering wheel axle 1 is of tubular construction for the purpose of inclosing therein a pinion shaft 2 which carries at its opposite ends pinions 3 fast thereon. Bearings 4 are provided for the shaft 3 within the tubular axle 1.

At a point between the ends of the shaft 2, the latter has fast thereon a worm gear 5 which meshes with and is driven by another worm gear 6 fast on the steering shaft 7 on which the usual hand controlling wheel, (not shown) is fastened so that when said hand controlling wheel is turned, a corresponding turning movement is imparted to the pinion shaft 2.

The opposite ends of the tubular axle 1 are expanded to form substantially quadrant shaped housings 8 each of which has extending vertically therethrough a pivot pin 9 which connects the adjacent steering wheel knuckle to said housing. Each steering wheel 10 is mounted upon and revolves around a spindle 11 extending outwardly from the steering knuckle 12 which is provided with fork arms 13, the latter embracing the housing 8 and formed with openings to receive the pivot pin 9. The pivot pin 9 is shown as formed with a squared portion 14 to fit a corresponding opening in the upper fork arm 13, and another squared portion 15 to fit a corresponding shaped opening in the lower fork arm 13. Said pin is also provided with still another squared portion 16 which fits through a correspondingly shaped opening in a buffer arm 17, said buffer arm and the pin 9 turning together, the pin being actuated by said arm 17.

At its inner end, the arm 17 is provided with a substantially perpendicular or right angular extension 18 having an eye or opening formed through the same to receive a bolt 19 which is carried by a toothed sector 20 having an arcuate gear face 21 described on the arc of the circle of which the pin 9 is the center. The gear face 21 is engaged and actuated by the pinion 3 at the adjacent end of the shaft 2.

The bolt 19 is threaded to receive nuts 22 located at opposite sides of the arm 17. Buffer springs 23 are located at opposite sides of the arm 17, said springs encircling the bolt 19 and being confined between the arm 17 and the nuts 22. By adjusting the nuts 22 the springs 23 may be placed under greater or less tension as may be required. vided with a detachable cover plate 24 secured in place by fastening means 25. This gives access to the gearing contained in each of the housings 8.

By reference to Fig. 1, it will be noticed that at one end of the axle, the gear face 21 of the sector 20 is disposed upwardly, the adjacent pinion 3 being located above and meshing with said gear face. At the opposite end of the axle, the gear face 21 is disposed downwardly and the adjacent pinion 3 meshes therewith on the under side. Therefore when the shaft 2 is turned in a certain direction, both of the steering wheels 10 are caused to turn in the same direction. It will also be noticed that at one end of the axle, the extension 18 of the arm 17 is turned downwardly while at the opposite end of the axle said extension 18 is turned upwardly. This enables both of the housings 8 to be constructed of equal depth. The end wall 26 of each housing 8 is formed with an opening normally closed by means of a detachable plug 27, the opening being of sufficient size to permit the axle 2 to be withdrawn through one or the other of the housings 8 for repair and adjustment purposes.

It will be seen from the foregoing description taken in connection with the accompanying drawings that the tubular axle and the housing extensions thereof including the housing extension 28 for the worm gears 5 and 6, are practically oil tight and therefore all of the working parts of the steering mechanism may run in lubricating material with which said axle and its housing extensions may be filled. Furthermore there are no outside parts, such as the usual steering connections to be struck by objects and become broken, twisted or otherwise injured. Furthermore the steering wheels may be turned vertically through an arc of ninety degrees or to an angle of forty-five degrees in both directions in relation to the longitudinal axis of the vehicle. The buffer springs 23 form a yielding connection between the buffer arm 17 which has a rigid connection with the wheel spindle and the sector 20 which is merely journaled on the pivot pin 9 and which may be said to have a fixed relation to the shaft 2 when the sector is at rest. Therefore sudden twisting or turning movements of the steering wheels will be compensated for or taken up and not imparted to the steering shaft and hand controlling wheel of the vehicle.

I claim:

1. The combination with the steering wheels of a vehicle, of a tubular axle for said wheels, steering knuckles pivotally connected to the end portions of said tubular axle, pivot pins having a fixed relation to said knuckles and passing through said tubular axle, sector gears loose on said pivot pins, a pinion shaft within said tubular axle having pinions meshing with said sector gears, and yieldable cushioning means between said sector gears and pivot pins.

2. The combination with the steering wheels of a vehicle, of steering knuckles on which said wheels are mounted, a tubular axle having expanded end portions forming gear housings, pivot pins connecting said steering knuckles with said housings and passing through the latter, sector gears journaled on said pins, a pinion shaft arranged within said axle and having pinions fast thereon and engaging said sector gears, buffer arms fast on said pivot pins and having a fixed relation to the steering knuckles, and yieldable means interposed between each of said buffer arms and the adjacent sector gear.

3. The combination with the steering wheels of a vehicle, of steering knuckles on which said wheels are mounted, a tubular axle having expanded end portions forming gear housings, pivot pins connecting said steering knuckles with said housings and passing through the latter, sector gears journaled on said pins, a pinion shaft arranged within said axle and having pinions fast thereon and engaging said sector gears, buffer arms fast on said pivot pins and having a fixed relation to the steering knuckles, yieldable means interposed between each of said buffer arms and the adjacent sector gear, and means for adjusting the tension of said yieldable means.

In testimony whereof I affix my signature.

WALTER A. MORKERT.